United States Patent [19]

Ishiyama et al.

[11] Patent Number: 5,543,070
[45] Date of Patent: Aug. 6, 1996

[54] MAGNETIC RECORDING POWDER HAVING LOW CURIE TEMPERATURE AND HIGH SATURATION MAGNETIZATION

[75] Inventors: Kouichi Ishiyama; Kazunori Igarashi; Norikazu Komada; Takuo Takeshita, all of Omiya; Kiyoyuki Ookubo, Kitamoto, all of Japan

[73] Assignee: Mitsubishi Materials Corporation, Tokyo, Japan

[21] Appl. No.: 352,137

[22] Filed: Dec. 1, 1994

[30] Foreign Application Priority Data

Mar. 31, 1994 [JP] Japan .................................. 6-062651

[51] Int. Cl.$^6$ .................................................. C04B 35/26
[52] U.S. Cl. ...................... 252/62.59; 252/62.63; 252/62.64; 252/62.6; 252/62.62; 423/594
[58] Field of Search .......................... 252/62.59, 62.63, 252/62.64, 62.6, 62.62; 423/594

[56] References Cited

U.S. PATENT DOCUMENTS 5,062,983  11/1991  Yamamoto et al. ................. 252/62.57

*Primary Examiner*—Melissa Bonner
*Attorney, Agent, or Firm*—Armstrong, Westerman, Hattori, McLeland & Naughton

[57] ABSTRACT

This invention relates to a magnetic recording powder having a low Curie temperature and a high saturation magnetization ($\sigma s$). The magnetic recording powder of this invention is of a composite oxide having a hexagonal ferrite type crystal structure comprises: (a) between 14 and 20 atomic % of at least one of strontium oxide and barium oxide, (b) between 15 and 40 atomic % of chromium oxide, (c) between 2 and 15 atomic % of at least one member of the group consisting of zinc oxide, magnesium oxide and copper oxide, (d) between 2 and 15 atomic % of at least one member of the group consisting of titanium oxide, zirconium oxide and tin oxide, with substantial remainder being iron oxide and unavoidable impurities. Further, the magnetic recording powder of this invention is of a composite oxide having saturation magnetization ($\sigma s$) of 15 emu/g or higher, and a Curie temperature (Tc) of 155° C. or lower.

25 Claims, No Drawings

MAGNETIC RECORDING POWDER HAVING LOW CURIE TEMPERATURE AND HIGH SATURATION MAGNETIZATION

BACKGROUND OF THE INVENTION

1. Field of the Invention

The present invention relates to a magnetic recording powder having a low Curie temperature and a high saturation magnetization which powder is suitable for use in forming a magnetic recording layer for a magnetic card, magnetic tape, magnetic disk or like magnetic storage medium.

2. Description of the Relevant Art

In general, as magnetic recording powders having a low Curie temperature, magnetic recording powders having a saturation magnetization ($\sigma s$) of 8 to 10 emu/g, a Curie temperature (Tc) of about 150° C. and a coercive force (iHc) of 5 kOe or greater have frequently been used as disclosed in, for example, Japanese Unexamined Patent Publication No. 3-124003.

The development of high density magnetic recording in recent years has been remarkable. Accordingly, a magnetic recording powder used to form a magnetic recording layer is required to have a higher saturation magnetization. However, the conventionally used magnetic recording powders cannot meet such demand because each has a low saturation magnetization of 8 to 10 emu/g.

Accordingly, the present inventors carried out research in order to develop a magnetic recording powder having a low Curie temperature (Tc) of about 150° C., a coercive force (iHc) of 5 kOe or greater, and a high saturation magnetization ($\sigma s$) and obtained the following results from such research which are hereinafter described.

SUMMARY OF THE INVENTION

When a magnetic recording powder is made of a composite oxide having a hexagonal ferrite type crystal structure and containing:

a) 14 to 20 atomic % (hereinafter, "%") of strontium oxide (hereinafter, "SrO") and/or barium oxide (hereinafter, "BaO"), b) 15 to 40 atomic % of chromium oxide (hereinafter, $Cr_2O_3$), c) 2 to 15 atomic % of one or more of copper oxide (hereinafter, "CuO"), zinc oxide (hereinafter, "ZnO") and magnesium oxide (hereinafter "MgO"), d) 2 to 15 atomic % of one or more of titanium oxide, zirconium oxide and tin oxide (hereinafter, "TiO" "$ZrO_2$" and "$SnO_2$", respectively) and the remainder being substantially iron oxide (hereinafter, "$Fe_2O_3$") and unavoidable impurities, the magnetic recording powder has a high saturation magnetization of 15 emu/g or higher with a Curie temperature of 155° C. or lower and a coercive force of 5 kOe or greater. Such a magnetic recording powder allows for higher density recording.

This invention is developed based on the above research results. Hereinafter, a description is provided on why the composition of the magnetic recording powder according to the invention is defined as set forth above.

(a) SrO, BaO

These components are essential for forming a hexagonal ferrite type crystal structure which is necessary to attain magnetic characteristics required for the magnetic recording powder. The range of the content of such components is determined to be 14 to 20% because the saturation magnetization ($\sigma s$) is reduced both when their content is less than 14% and when it is more than 20%. Preferably, the content range of such 5 components is 16 to 18%.

(b) $CR_2O_3$ $CR_2O_3$ acts to lower the Curie temperature of the magnetic recording powder. The range of the content of $CR_2O_3$ is determined to be 15 to 40% because the Curie temperature cannot be lowered to a desired level when the $CR_2O_3$ content is less than 15%, and because the saturation magnetization ($\sigma s$) is reduced when the $CR_2O_3$ content is more than 40%. Preferably, the range of the $Cr_2O_3$ content is 20 to 35%; and it is still more preferable to have such $CR_2O_3$ content to be 25 to 35%.

If zinc oxide is the only member of component c), above, and titanium oxide is the only member of component b), above, the amount of chromium oxide is preferably 15 to 30 atomic %, yet still more preferably 20 to 28 atomic %.

(c) CuO, ZnO and MgO

CuO, ZnO and MgO act to enhance the saturation magnetization ($\sigma s$), while suppressing the Curie temperature from increasing. The range of the content of one or more of CuO, ZnO and MgO is determined to be 2 to 15% because a desired saturation magnetization cannot be obtained when the content is less than 2% and because the saturation magnetization ($\sigma s$) and the coercive force (iHc) are reduced when the content is more than 15%. Preferably, the content range thereof is 6 to 11%.

(d) $TiO_2$, $ZrO_2$, $SnO_2$

By coexisting with one or more of ZnO, CuO and MgO, such components act to further enhance the saturation magnetization ($\sigma s$). The range of the content of such components is determined to be 2 to 15% because a desired saturation magnetization ($\sigma s$) cannot be obtained when the content of such components is less than 2% and because the saturation magnetization ($\sigma s$) and the coercive force (iHc) are reduced when the content of such components is more than 15%. Preferably, the content range thereof is 6 to 11%.

An especially preferred composition is: a) 14 to 20 atomic % of strontium oxide and/or barium oxide, b) 15 to 30 atomic % of chromium oxide, c) 2 to 15 atomic % of zinc oxide, d) 2 to 15 atomic % of titanium oxide, substantial remainder being iron oxide and unavoidable impurities. Also, here the preferred amount of strontium oxide and/or barium oxide is 16 to 18 atomic %, but the preferred amount of chromium oxide is 20 to 28 atomic %, while the preferred amount of zinc oxide is 6 to 11 atomic %, and the preferred amount of titanium oxide is 6 to 11 atomic %.

Another preferred composition is: a) 14 to 20 atomic of strontium oxide and/or barium oxide, b) 20 to 40 atomic % of chromium oxide, c) 2 to 15 atomic % of magnesium oxide, d) 2 to 15 atomic % of titanium oxide and/or zirconium oxide, substantial remainder being iron oxide and unavoidable impurities.

Also, here the preferred amount of strontium oxide and/or barium oxide is 16 to 18 atomic %, the preferred amount of chromium oxide is 25 to 35 atomic %, the preferred amount of magnesium oxide is 6 to 11 atomic % and the preferred amount of titanium oxide and/or zirconium oxide is 6 to 11 atomic %.

Still another preferred composition is: a) 14 to 20 atomic % of strontium oxide and/or barium oxide, b) 20 to 40 atomic % of chromium oxide, c) 2 to 15 atomic % of copper oxide, d) 2 to 15 atomic % of at least one member of the group consisting of titanium oxide, zirconium oxide and tin oxide, substantial remainder being iron oxide and unavoidable impurities.

Also, here the preferred amount of strontium oxide and/or barium oxide is 16 to 18 atomic % the preferred amount chromium oxide is 25 to 35 atomic % the preferred amount of copper oxide is 6 to 11 atomic %, and the preferred amount of at least one of titanium oxide, zirconium oxide and tin oxide is 6 to 11 atomic %.

The following examples show preferred embodiments, and are not intended to restrict the spirit and scope of this invention.

EXAMPLES

Example 1

The materials powders that were prepared include $BaCO_3$ powder, $SrCO_3$ powder, $Cr_2O_3$ powder, CuO powder, $TiO_2$ powder, $SnO_2$ powder and $Fe_2O_3$ powder, each powder having a specified average particle diameter of 0.5 to 3.0 μm. These powders were compounded so as to have compounding compositions, as shown in TABLE-1 to TABLE-3, and were kneaded by means of a kneader. Thereafter, the resulting kneaded material was pre-calcined at a temperature of 1150° to 1250° C. in the atmosphere for 6 hours. The obtained pre-calcined material was pulverized by means of an attritor, and calcined at a temperature of 1250° to 1450° C. in the atmosphere for 6 hours. The calcined material was further pulverized by means of the attritor to have an average particle diameter of as small as 0.4 μm, and annealed at a temperature of 500° to 1000° C. in the atmosphere for 5 hours. In this manner, the magnetic recording powders 1 to 21 of this invention, and the comparative magnetic recording powders 1 to 14 having component compositions shown in TABLE-1 to TABLE-3 were produced. It is noted that one of the components of the comparative magnetic recording powders 1 to 14 falls outside the range according to the invention (and, as such, is marked with an asterisk (*) in TABLE-3 ).

The saturation magnetization (σs), Curie temperature (Tc), and coercive force (iHc) were measured for the above magnetic recording powders. The measurement results are shown in TABLE-4 and TABLE-5. Further, the crystal structure of each of the inventive magnetic recording powders 1 to 21 was observed by means of an X-ray diffractometer.

TABLE 1

| | COMPOUNDING COMPOSITION (WEIGHT %) | | | | | | | | COMPONENT COMPOSITION (ATOMIC %) | | | | | | | |
|---|---|---|---|---|---|---|---|---|---|---|---|---|---|---|---|---|
| TYPE | $BaCO_3$ | $SrCO_3$ | $Cr_2O_3$ | CuO | $TiO_2$ | $ZrO_2$ | $SnO_2$ | $Fe_2O_3$ | BaO | SrO | $Cr_2O_3$ | CuO | $TiO_2$ | $ZrO_2$ | $SnO_2$ | $Fe_2O_3$ + IMPUR. |
| INVENTION | | | | | | | | | | | | | | | | |
| 1 | 25.5 | — | 30.3 | 4.3 | 1.5 | 2.0 | 2.7 | REM. | 19.2 | — | 30.8 | 8.2 | 2.7 | 2.5 | 2.8 | REM. |
| 2 | 20.0 | — | 30.3 | 4.3 | 1.5 | 2.0 | 2.7 | REM. | 14.5 | — | 30.3 | 9.1 | 2.9 | 2.4 | 2.5 | REM. |
| 3 | — | 21.0 | 31.0 | 4.8 | 1.5 | 2.5 | 3.0 | REM. | — | 19.8 | 29.4 | 8.6 | 2.9 | 2.8 | 2.9 | REM. |
| 4 | — | 15.0 | 31.0 | 4.8 | 1.5 | 2.5 | 3.0 | REM. | — | 14.7 | 30.2 | 8.8 | 2.6 | 3.0 | 2.5 | REM. |
| 5 | 11.0 | 9.0 | 29.5 | 4.5 | 1.5 | 2.5 | 2.5 | REM. | 8.2 | 9.0 | 28.8 | 8.3 | 2.5 | 2.8 | 2.7 | REM. |
| 6 | 11.5 | 8.5 | 40.0 | 5.0 | 1.5 | 2.0 | 3.0 | REM. | 8.5 | 8.4 | 38.9 | 8.9 | 2.8 | 2.6 | 2.9 | REM. |
| 7 | 11.0 | 9.0 | 20.5 | 4.5 | 1.5 | 2.5 | 3.0 | REM. | 8.3 | 8.9 | 20.2 | 8.5 | 2.7 | 3.0 | 2.8 | REM. |
| 8 | 11.5 | 8.0 | 30.0 | 4.5 | 1.5 | 2.0 | 3.0 | REM. | 8.5 | 8.2 | 29.4 | 8.2 | 2.4 | 2.6 | 2.9 | REM. |
| 9 | 11.5 | 9.0 | 32.5 | 8.0 | 1.5 | 2.5 | 3.0 | REM. | 8.4 | 8.5 | 30.5 | 14.8 | 2.8 | 3.0 | 2.9 | REM. |
| 10 | 11.5 | 8.5 | 30.0 | 1.5 | 1.5 | 2.5 | 2.5 | REM. | 8.8 | 8.6 | 29.9 | 2.6 | 2.5 | 2.9 | 2.6 | REM. |
| 11 | 11.5 | 8.5 | 31.0 | 4.5 | 1.5 | 2.0 | 3.0 | REM. | 8.6 | 8.7 | 30.1 | 8.3 | 2.7 | 2.6 | 2.7 | REM. |

(IMPUR. and REM. denote impurities and remainder, respectively.)

TABLE 2

| | COMPOUNDING COMPOSITION (WEIGHT %) | | | | | | | | COMPONENT COMPOSITION (ATOMIC %) | | | | | | | |
|---|---|---|---|---|---|---|---|---|---|---|---|---|---|---|---|---|
| TYPE | $BaCO_3$ | $SrCO_3$ | $Cr_2O_3$ | CuO | $TiO_2$ | $ZrO_2$ | $SnO_2$ | $Fe_2O_3$ | BaO | SrO | $Cr_2O_3$ | CuO | $TiO_2$ | $ZrO_2$ | $SnO_2$ | $Fe_2O_3$ + IMPUR. |
| INVENTION | | | | | | | | | | | | | | | | |
| 12 | 12.0 | 9.0 | 32.0 | 5.0 | 8.5 | — | — | REM. | 8.4 | 8.5 | 29.8 | 8.5 | 14.4 | — | — | REM. |
| 13 | 11.0 | 8.5 | 29.5 | 4.5 | 8.5 | — | — | REM. | 8.3 | 8.4 | 29.1 | 8.3 | 2.4 | — | — | REM. |
| 14 | 11.5 | 9.0 | 31.5 | 4.5 | — | 12.5 | — | REM. | 8.3 | 8.8 | 30.5 | 8.6 | — | 14.8 | — | REM. |
| 15 | 11.5 | 8.0 | 29.5 | 4.5 | — | 2.5 | — | REM. | 8.5 | 8.3 | 29.4 | 8.4 | — | 2.9 | — | REM. |
| 16 | 12.0 | 8.5 | 31.0 | 4.5 | — | — | 15.0 | REM. | 8.9 | 8.7 | 30.8 | 8.6 | — | — | 14.7 | REM. |
| 17 | 11.5 | 8.5 | 30.5 | 4.5 | — | — | 2.5 | REM. | 8.6 | 8.5 | 30.4 | 8.5 | — | — | 2.6 | REM. |
| 18 | 11.5 | 8.5 | 31.0 | 5.0 | 2.5 | 3.5 | — | REM. | 8.5 | 8.2 | 29.9 | 8.7 | 4.3 | 4.4 | — | REM. |

TABLE 2-continued

| | COMPOUNDING COMPOSITION (WEIGHT %) | | | | | | | | COMPONENT COMPOSITION (ATOMIC %) | | | | | | | Fe$_2$O$_3$ + |
|---|---|---|---|---|---|---|---|---|---|---|---|---|---|---|---|---|
| TYPE | BaCO$_3$ | SrCO$_3$ | Cr$_2$O$_3$ | CuO | TiO$_2$ | ZrO$_2$ | SnO$_2$ | Fe$_2$O$_3$ | BaO | SrO | Cr$_2$O$_3$ | CuO | TiO$_2$ | ZrO$_2$ | SnO$_2$ | IMPUR. |
| 19 | 11.5 | 8.5 | 30.5 | 4.5 | 2.5 | — | 4.5 | REM. | 8.6 | 8.4 | 29.6 | 8.8 | 4.2 | — | 4.4 | REM. |
| 20 | 11.5 | 8.5 | 30.5 | 4.5 | — | 3.5 | 4.5 | REM. | 8.8 | 8.9 | 30.3 | 8.3 | — | 4.1 | 4.3 | REM. |
| 21 | 11.5 | 8.5 | 30.5 | 4.5 | 1.5 | 2.5 | 2.5 | REM. | 8.5 | 8.6 | 30.2 | 8.6 | 2.7 | 2.8 | 2.8 | REM. |

(IMPUR. and REM. denote impurities and remainder, respectively.)

TABLE 3

| | COMPOUNDING COMPOSITION (WEIGHT %) | | | | | | | | COMPONENT COMPOSITION (ATOMIC %) | | | | | | | Fe$_2$O$_3$ + |
|---|---|---|---|---|---|---|---|---|---|---|---|---|---|---|---|---|
| TYPE | BaCO$_3$ | SrCO$_3$ | Cr$_2$O$_3$ | CuO | TiO$_2$ | ZrO$_2$ | SnO$_2$ | Fe$_2$O$_3$ | BaO | SrO | Cr$_2$O$_3$ | CuO | TiO$_2$ | ZrO$_2$ | SnO$_2$ | IMPUR. |
| COMPARATIVE EXAMPLES | | | | | | | | | | | | | | | | |
| 1 | 31.0 | — | 30.0 | 4.0 | 1.5 | 2.5 | 2.5 | REM. | 24.5* | — | 30.6 | 8.2 | 3.0 | 2.7 | 2.7 | REM. |
| 2 | 14.5 | — | 30.0 | 4.5 | 1.5 | 2.5 | 2.5 | REM. | 10.8* | — | 29.8 | 8.4 | 2.9 | 2.8 | 2.6 | REM. |
| 3 | — | 25.0 | 31.0 | 5.0 | 1.5 | 2.5 | 3.0 | REM. | — | 24.2* | 29.4 | 8.5 | 2.7 | 2.8 | 2.8 | REM. |
| 4 | — | 11.5 | 31.5 | 4.5 | 1.5 | 2.5 | 3.0 | REM. | — | 11.1* | 30.2 | 8.1 | 2.7 | 2.6 | 3.0 | REM. |
| 5 | 11.5 | 9.0 | 17.5 | 5.0 | 1.5 | 2.5 | 3.0 | REM. | 8.4 | 8.7 | 17.1* | 8.7 | 2.5 | 2.9 | 2.8 | REM. |
| 6 | 11.5 | 9.0 | 45.0 | 5.0 | 1.5 | 2.5 | 3.0 | REM. | 8.5 | 8.7 | 43.9* | 8.5 | 2.9 | 2.7 | 2.7 | REM. |
| 7 | 12.5 | 9.5 | 33.5 | 10.0 | 1.5 | 2.0 | 3.0 | REM. | 8.7 | 8.8 | 31.1 | 17.9* | 2.7 | 2.4 | 2.8 | REM. |
| 8 | 11.0 | 8.5 | 30.0 | 0.5 | 1.5 | 2.5 | 3.0 | REM. | 8.4 | 8.6 | 30.3 | 1.1* | 2.8 | 3.0 | 2.9 | REM. |
| 9 | 12.5 | 9.0 | 32.5 | 5.0 | 11.0 | — | — | REM. | 8.5 | 8.4 | 29.6 | 8.7 | 18.3* | — | — | REM. |
| 10 | 11.5 | 8.5 | 29.5 | 4.5 | 0.5 | — | — | REM. | 8.8 | 8.4 | 29.2 | 8.5 | 0.9* | — | — | REM. |
| 11 | 12.0 | 9.0 | 31.5 | 4.5 | — | 15.5 | — | REM. | 8.6 | 8.6 | 30.0 | 8.3 | — | 18.4* | — | REM. |
| 12 | 11.5 | 8.5 | 30.0 | 4.5 | — | 1.0 | — | REM. | 8.7 | 8.4 | 30.1 | 8.2 | — | 1.2* | — | REM. |
| 13 | 11.5 | 8.5 | 30.5 | 4.5 | — | — | 17.5 | REM. | 8.6 | 8.5 | 30.4 | 8.5 | — | — | 17.6* | REM. |
| 14 | 11.0 | 8.0 | 29.5 | 4.5 | — | — | 1.0 | REM. | 8.5 | 8.3 | 29.5 | 8.4 | — | — | 1.0* | REM. |

(Values marked with * fall outside the ranges according to the invention. IMPUR. and REM. denote impurities and remainder, respectively.)

TABLE 4

| | MEASUREMENT RESULTS | | |
|---|---|---|---|
| TYPE | SATURATION MAGNETIZATION (emu/g) | CURIE TEMPERATURE (C.°) | COERCIVE FORCE (kOe) |
| INVENTION | | | |
| 1 | 16.1 | 150 | 6.9 |
| 2 | 15.5 | 150 | 7.5 |
| 3 | 16.3 | 155 | 6.5 |
| 4 | 15.9 | 150 | 7.8 |
| 5 | 19.5 | 150 | 8.8 |
| 6 | 16.1 | 145 | 9.1 |
| 7 | 18.8 | 155 | 8.5 |
| 8 | 20.1 | 150 | 8.9 |
| 9 | 15.9 | 145 | 5.5 |
| 10 | 16.0 | 155 | 7.8 |
| 11 | 20.5 | 150 | 9.7 |
| 12 | 16.5 | 140 | 6.0 |
| 13 | 15.8 | 150 | 8.0 |
| 14 | 16.2 | 145 | 5.7 |
| 15 | 16.1 | 150 | 7.7 |
| 16 | 15.9 | 140 | 5.5 |
| 17 | 16.0 | 145 | 9.0 |
| 18 | 20.1 | 150 | 10.0 |
| 19 | 20.5 | 150 | 10.2 |
| 20 | 19.9 | 145 | 9.5 |
| 21 | 21.5 | 145 | 10.5 |

TABLE 5

| | MEASUREMENT RESULTS | | |
|---|---|---|---|
| TYPE | SATURATION MAGNETIZATION (emu/g) | CURIE TEMPERATURE (C.°) | COERCIVE FORCE (kOe) |
| COMPARATIVE EXAMPLES | | | |
| 1 | 13.5 | 145 | 6.1 |
| 2 | 12.1 | 155 | 7.5 |
| 3 | 14.0 | 150 | 6.3 |
| 4 | 12.5 | 155 | 7.6 |
| 5 | 10.1 | 140 | 8.0 |
| 6 | 17.2 | 165 | 7.8 |
| 7 | 10.0 | 140 | 2.1 |
| 8 | 13.5 | 150 | 6.6 |
| 9 | 12.7 | 145 | 3.5 |
| 10 | 14.1 | 150 | 6.1 |
| 11 | 13.5 | 140 | 4.0 |
| 12 | 14.0 | 155 | 5.9 |
| 13 | 13.3 | 140 | 2.9 |
| 14 | 13.6 | 150 | 6.3 |

From the results shown in TABLE-4 and TABLE-5, it is seen that each of the magnetic recording powders 1 to 21 of this invention has an exceedingly high saturation magnetization ($\sigma$s) of 15 emu/g or higher, and excellent magnetic characteristics: a coercive force of 5 kOe or greater and a Curie temperature of 155° C. or lower. On the contrary, as seen in the comparative magnetic recording powders 1 to 14, at least one of the characteristics (i.e., the saturation magnetization ($\sigma s$), coercive force (iHc) and Curie temperature (Tc)) becomes poor when the content of any of the components (marked with an asterisk (*) in TABLE-3) falls outside the range according to the invention.

Moreover, each of the magnetic recording powders 1 to 21 of this invention had a hexagonal ferrite type crystal structure.

As set forth above, the magnetic recording powder according to the invention has a saturation magnetization ($\sigma s$) of 15 emu/g or higher, which is considerably higher than the saturation magnetization ($\sigma s$) of 8 to 10 emu/g of the conventional magnetic recording powders; and the Curie temperature (Tc) and coercive force (iHc) thereof are as good as those of the conventional magnetic recording powders. Thus, the use of this magnetic recording powder for a magnetic card, magnetic tape, magnetic disk or like magnetic storage medium results in excellent effects (such as, a resulting thinner magnetic storage medium and high density recording).

Example 2

The material powders that were prepared include $BaCO_3$ powder, $SrCO_3$ powder, $Cr_2O_3$ powder, ZnO powder, $TiO_2$ powder and $Fe_2O_3$ powder, each powder having a specified average particle diameter of 0.5 to 3.0 μm. Such powders were compounded to have compounding compositions, as shown in TABLE-6 and TABLE-7, and kneaded by means of a kneader. Thereafter, the resulting kneaded material was pre-calcined at a temperature of 1150° to 1250° C. in the atmosphere for 6 hours. The obtained pre-calcined material was pulverized by means of an attritor, and calcined at a temperature of 1250° to 1350° C. in the atmosphere for 6 hours. The calcined material was further pulverized by means of the attritor in order to have an average particle diameter of as small as 0.4 μm, and annealed at a temperature of 400° to 800° C. in the atmosphere for 5 hours. In this manner, the inventive magnetic recording powders 1 to 11 and the comparative magnetic recording powders 1 to 10 having component compositions as shown in TABLE-6 and TABLE-7 were produced. It is noted that one of the components of the comparative magnetic recording powders 1 to 10 falls outside the range according to the invention (and is marked with an asterisk (*) in TABLE-7).

The saturation magnetization ($\sigma s$), Curie temperature (Tc) and coercive force (iHc) were measured for the above magnetic recording powders. The measurement results are shown in TABLE-8 and TABLE-9. Furthermore, the crystal structure of each of the inventive magnetic recording powders 1 to 11 was observed by means of an X-ray diffractometer.

TABLE 6

| TYPE | COMPOUNDING COMPOSITION (WEIGHT %) | | | | | | COMPONENT COMPOSITION (ATOMIC %) | | | | | |
|---|---|---|---|---|---|---|---|---|---|---|---|---|
| | $BaCO_3$ | $SrCO_3$ | $Cr_2O_3$ | ZnO | $TiO_2$ | $Fe_2O_3$ | BaO | SrO | $Cr_2O_3$ | ZnO | $TiO_2$ | $Fe_2O_3$ + IMPURITIES |
| INVENTION | | | | | | | | | | | | |
| 1 | 26.3 | — | 23.2 | 4.1 | 3.8 | REM. | 19.6 | — | 22.3 | 7.8 | 7.9 | REM. |
| 2 | 19.7 | — | 23.6 | 4.2 | 4.2 | REM. | 14.3 | — | 22.4 | 7.7 | 8.4 | REM. |
| 3 | — | 21.1 | 24.7 | 3.4 | 3.9 | REM. | — | 19.6 | 22.5 | 6.0 | 8.2 | REM. |
| 4 | — | 15.7 | 24.8 | 5.5 | 3.6 | REM. | — | 14.2 | 22.4 | 9.7 | 7.3 | REM. |
| 5 | 23.3 | — | 31.0 | 3.9 | 4.6 | REM. | 17.5 | — | 29.7 | 7.2 | 9.2 | REM. |
| 6 | — | 18.6 | 18.3 | 4.0 | 4.3 | REM. | — | 16.8 | 15.3 | 7.3 | 9.0 | REM. |
| 7 | 13.1 | 10.0 | 24.5 | 4.6 | 3.8 | REM. | 9.6 | 9.2 | 22.3 | 8.2 | 8.1 | REM. |
| 8 | 23.7 | — | 25.1 | 8.0 | 3.8 | REM. | 16.7 | — | 22.4 | 14.8 | 8.0 | REM. |
| 9 | — | 18.2 | 24.9 | 1.2 | 3.4 | REM. | — | 17.1 | 22.6 | 2.1 | 7.5 | REM. |
| 10 | 24.8 | — | 23.1 | 4.4 | 7.6 | REM. | 17.5 | — | 22.1 | 8.0 | 14.9 | REM. |
| 11 | — | 18.4 | 23.0 | 4.1 | 1.0 | REM. | — | 17.2 | 22.3 | 7.5 | 2.2 | REM. |

(REM. denotes remainder.)

TABLE 7

| TYPE | COMPOUNDING COMPOSITION (WEIGHT %) | | | | | | COMPONENT COMPOSITION (ATOMIC %) | | | | | |
|---|---|---|---|---|---|---|---|---|---|---|---|---|
| | $BaCO_3$ | $SrCO_3$ | $Cr_2O_3$ | ZnO | $TiO_2$ | $Fe_2O_3$ | BaO | SrO | $Cr_2O_3$ | ZnO | $TiO_2$ | $Fe_2O_3$ + IMPURITIES |
| COMPARATIVE EXAMPLES | | | | | | | | | | | | |
| 1 | 14.4 | — | 23.4 | 4.0 | 3.6 | REM. | 10.2* | — | 22.1 | 7.4 | 7.9 | REM. |
| 2 | 33.1 | — | 23.8 | 3.8 | 3.9 | REM. | 25.3* | — | 22.3 | 7.3 | 8.3 | REM. |
| 3 | — | 9.9 | 24.5 | 4.0 | 4.0 | REM. | — | 9.4* | 22.4 | 7.2 | 8.2 | REM. |
| 4 | — | 27.2 | 25.2 | 3.5 | 3.6 | REM. | — | 26.3* | 22.0 | 6.3 | 7.4 | REM. |
| 5 | 12.9 | 10.4 | 15.5 | 4.9 | 3.4 | REM. | 9.2 | 9.4 | 12.2* | 9.0 | 7.4 | REM. |

TABLE 7-continued

| | COMPOUNDING | | | | | | COMPONENT COMPOSITION (ATOMIC %) | | | | | |
|---|---|---|---|---|---|---|---|---|---|---|---|---|
| | COMPOSITION (WEIGHT %) | | | | | | | | | | | $Fe_2O_3$ + |
| TYPE | $BaCO_3$ | $SrCO_3$ | $Cr_2O_3$ | ZnO | $TiO_2$ | $Fe_2O_3$ | BaO | SrO | $Cr_2O_3$ | ZnO | $TiO_2$ | IMPURITIES |
| 6 | 23.9 | — | 36.5 | 3.2 | 4.5 | REM. | 17.4 | — | 35.3* | 6.0 | 9.2 | REM. |
| 7 | — | 18.6 | 24.0 | 0.8 | 4.4 | REM. | — | 17.3 | 21.5 | 1.3* | 9.0 | REM. |
| 8 | 25.4 | — | 24.9 | 10.2 | 2.9 | REM. | 18.0 | — | 22.4 | 18.2* | 6.0 | REM. |
| 9 | — | 17.5 | 24.7 | 5.5 | 0.5 | REM. | — | 16.5 | 22.5 | 10.0 | 1.1* | REM. |
| 10 | 25.1 | — | 24.8 | 4.4 | 10.9 | REM. | 17.5 | — | 21.5 | 7.8 | 20.1* | REM. |

(Values marked with * fall outside the ranges according to the invention. REM. denotes remainder.)

TABLE 8

MEASUREMENT RESULTS

| TYPE | SATURATION MAGNETIZA- TION (emu/g) | CURIE TEMPERA- TURE (C.°) | COERCIVE FORCE (kOe) |
|---|---|---|---|
| INVENTION | | | |
| 1 | 15.8 | 145 | 7.2 |
| 2 | 16.1 | 150 | 8.6 |
| 3 | 15.2 | 145 | 7.7 |
| 4 | 16.1 | 145 | 8.8 |
| 5 | 15.4 | 140 | 9.3 |
| 6 | 19.5 | 155 | 6.8 |
| 7 | 20.0 | 150 | 9.8 |
| 8 | 18.8 | 140 | 5.5 |
| 9 | 16.9 | 150 | 8.1 |
| 10 | 17.3 | 145 | 6.0 |
| 11 | 16.5 | 150 | 8.5 |

TABLE 9

MEASUREMENT RESULTS

| TYPE | SATURATION MAGNETIZATION (emu/g) | Curie Temperature (C.°) | Coercive Force (kOe) |
|---|---|---|---|
| COMPARA- TIVE EXAMPLES | | | |
| 1 | 8.5 | 145 | 5.1 |
| 2 | 10.1 | 150 | 6.0 |
| 3 | 8.3 | 150 | 5.0 |
| 4 | 11.4 | 140 | 6.2 |
| 5 | 16.5 | 180 | 7.5 |
| 6 | 9.2 | 150 | 7.3 |
| 7 | 7.3 | 150 | 5.6 |
| 8 | 12.1 | 150 | 4.1 |
| 9 | 8.9 | 145 | 6.7 |
| 10 | 11.2 | 140 | 3.0 |

From the results shown in TABLE-8 and TABLE-9, it is seen that each of the inventive magnetic recording powders 1 to 11 has an exceedingly high saturation magnetization ($\sigma$s) of 15 emu/g or higher, and excellent magnetic characteristics: a coercive force of 5 kOe or greater and a Curie temperature of 155° C. or lower. On the contrary, as seen in the comparative magnetic recording powders 1 to 10, at least one of the characteristics (i.e., the saturation magnetization ($\sigma$s), coercive force (iHc) and Curie temperature (Tc)) becomes poor when the content of one of the components (marked with an asterisk (*) in TABLE-7) falls outside the range according to the invention.

Furthermore, each of the magnetic recording powders 1 to 11 of this invention had a hexagonal ferrite type crystal structure.

As discusses above, the magnetic recording powder according to this invention has a saturation magnetization ($\sigma$s) of 15 emu/g or higher, which is considerably higher than the saturation magnetization ($\sigma$s) of 8 to 10 emu/g of the conventional magnetic recording powders. Further, the Curie temperature (Tc) and coercive force (iHc) of the magnetic recording powders of this invention are as good as those of the conventional magnetic recording powders. Thus, the use of the magnetic recording powder for a magnetic card, magnetic tape, magnetic disk or like magnetic storage medium results in significant benefits; such as, a thinner magnetic storage medium and high density recording.

Example 3

The material powders that were prepared include $BaCO_3$ powder, $SrCO_3$ powder, $Cr_2O_3$ powder, MgO powder, $TiO_2$ powder and $Fe_2O_3$ powder, each powder having a specified average particle diameter of 0.5 to 3.0 μm. These powders were compounded to have 15 compounding compositions as shown in TABLE-10 and TABLE-11 and kneaded by means of a kneader. Thereafter, the resulting kneaded material was pre-calcined at a temperature of 1150° to 1250° C. in the atmosphere for 6 hours. The obtained pre-calcined material was pulverized by means of an attritor, and calcined at a temperature of 1250° to 1350° C. in the atmosphere for 6 hours. The calcined material was further pulverized by means of the attritor in order to have an average particle diameter of as small as 0.4 μm, and annealed at a temperature of 400° to 800° C. in the atmosphere for 5 hours. In this manner, the magnetic recording powders 1 to 13 of this invention, and the comparative magnetic recording powders 1 to 12 having component compositions as shown in TABLE-10 and TABLE-11 were produced. It is noted that one of the components of the comparative magnetic recording powders 1 to 12 falls outside the range according to the invention (and is marked with an asterisk (*) in TABLE-11).

The saturation magnetization ($\sigma$s), Curie temperature (Tc) and coercive force (iHc) were measured for the above magnetic recording powders. The measurement results are shown in TABLE-12 and TABLE-13. Further, the crystal structure of each of the inventive magnetic recording powders 1 to 13 was observed by means of an X-ray diffractometer.

TABLE 10

| | COMPOUNDING COMPOSITION (WEIGHT %) | | | | | | | COMPONENT COMPOSITION (ATOMIC %) | | | | | | Fe₂O₃ + |
|---|---|---|---|---|---|---|---|---|---|---|---|---|---|---|
| TYPE | BaCO₃ | SrCO₃ | Cr₂O₃ | MgO | TiO₂ | ZrO₂ | Fe₂O₃ | BaO | SrO | Cr₂O₃ | MgO | TiO₂ | ZrO₂ | IMPUR. |
| INVENTION | | | | | | | | | | | | | | |
| 1 | 27.1 | — | 30.7 | 2.2 | 3.9 | — | REM. | 19.7 | — | 30.0 | 8.0 | 8.2 | — | REM. |
| 2 | 19.5 | — | 30.5 | 2.2 | — | 6.0 | REM. | 14.1 | — | 30.1 | 8.1 | — | 7.9 | REM. |
| 3 | — | 22.1 | 32.9 | 2.4 | 4.3 | — | REM. | — | 19.8 | 30.0 | 8.2 | 8.3 | — | REM. |
| 4 | — | 15.7 | 32.1 | 2.2 | — | 6.5 | REM. | — | 14.3 | 30.2 | 8.0 | — | 8.1 | REM. |
| 5 | 24.1 | — | 40.6 | 2.2 | 3.8 | — | REM. | 17.2 | — | 39.3 | 8.1 | 7.9 | — | REM. |
| 6 | — | 18.5 | 21.2 | 2.2 | — | 6.2 | REM. | — | 17.1 | 20.1 | 7.9 | — | 7.8 | REM. |
| 7 | 25.1 | — | 32.8 | 4.3 | 4.1 | — | REM. | 17.1 | — | 30.2 | 14.8 | 8.0 | — | REM. |
| 8 | — | 18.0 | 30.6 | 0.6 | — | 6.1 | REM. | — | 17.2 | 30.1 | 2.2 | — | 8.2 | REM. |
| 9 | 23.3 | — | 29.8 | 2.1 | 1.0 | — | REM. | 17.3 | — | 30.0 | 7.9 | 2.1 | — | REM. |
| 10 | — | 19.8 | 35.1 | 2.3 | 8.3 | — | REM. | — | 17.1 | 31.0 | 7.8 | 14.8 | — | REM. |
| 11 | 23.1 | — | 29.8 | 2.1 | — | 1.4 | REM. | 17.2 | — | 30.1 | 7.9 | — | 2.4 | REM. |
| 12 | — | 18.9 | 32.8 | 2.4 | — | 12.0 | REM. | — | 17.0 | 30.2 | 8.2 | — | 14.7 | REM. |
| 13 | 12.6 | 9.8 | 31.7 | 2.3 | 2.3 | 3.9 | REM. | 8.5 | 8.6 | 30.0 | 8.1 | 5.0 | 5.1 | REM. |

(IMPUR. and REM. denote impurities and remainder, respectively.)

TABLE 11

| | COMPOUNDING COMPOSITION (WEIGHT %) | | | | | | | COMPONENT COMPOSITION (ATOMIC %) | | | | | | Fe₂O₃ + |
|---|---|---|---|---|---|---|---|---|---|---|---|---|---|---|
| TYPE | BaCO₃ | SrCO₃ | Cr₂O₃ | MgO | TiO₂ | ZrO₂ | Fe₂O₃ | BaO | SrO | Cr₂O₃ | MgO | TiO₂ | ZrO₂ | IMPUR. |
| COMPARATIVE EXAMPLES | | | | | | | | | | | | | | |
| 1 | 13.8 | — | 31.5 | 2.0 | 4.3 | — | REM. | 9.8* | — | 30.1 | 7.8 | 8.1 | — | REM. |
| 2 | 31.4 | — | 29.8 | 1.9 | — | 6.4 | REM. | 24.1* | — | 30.2 | 8.0 | — | 8.2 | REM. |
| 3 | — | 9.9 | 32.5 | 2.2 | 4.3 | — | REM. | — | 9.0* | 30.1 | 7.9 | 7.5 | — | REM. |
| 4 | — | 26.6 | 32.0 | 2.0 | — | 6.5 | REM. | — | 25.1* | 29.9 | 7.7 | — | 8.1 | REM. |
| 5 | 23.0 | — | 18.4 | 2.0 | 4.0 | — | REM. | 17.0 | — | 18.0* | 8.0 | 7.9 | — | REM. |
| 6 | — | 18.2 | 46.1 | 2.0 | — | 6.5 | REM. | — | 17.0 | 43.1* | 7.9 | — | 8.0 | REM. |
| 7 | 12.2 | 9.3 | 31.1 | 0.3 | 4.0 | — | REM. | 9.3 | 9.1 | 31.0 | 1.2* | 8.2 | — | REM. |
| 8 | — | 19.9 | 40.1 | 5.0 | — | 7.2 | REM. | — | 17.3 | 35.0 | 17.3* | — | 7.9 | REM. |
| 9 | 22.6 | — | 29.8 | 2.0 | 0.5 | — | REM. | 17.2 | — | 30.1 | 7.9 | 1.0* | — | REM. |
| 10 | — | 19.6 | 34.7 | 2.0 | 10.5 | — | REM. | — | 17.0 | 30.0 | 8.0 | 18.0* | — | REM. |
| 11 | 22.7 | — | 29.4 | 2.0 | — | 0.8 | REM. | 17.3 | — | 29.8 | 8.1 | — | 1.1* | REM. |
| 12 | — | 18.5 | 33.0 | 2.2 | — | 16.5 | REM. | — | 16.9 | 30.1 | 8.1 | — | 19.0* | REM. |

(Values marked with * fall outside the ranges according to the invention. IMPUR. and REM. denote impurities and remainder, respectively.)

TABLE 12

| | MEASUREMENT RESULTS | | |
|---|---|---|---|
| TYPE | SATURATION MAGNETIZATION (emu/g) | CURIE TEMPERATURE (C.°) | COERCIVE FORCE (kOe) |
| INVENTION | | | |
| 1 | 15.0 | 135 | 5.5 |
| 2 | 16.1 | 145 | 6.1 |
| 3 | 15.1 | 135 | 5.8 |
| 4 | 15.9 | 145 | 6.5 |
| 5 | 16.0 | 130 | 8.8 |
| 6 | 23.9 | 155 | 9.7 |
| 7 | 18.9 | 140 | 5.5 |
| 8 | 15.6 | 145 | 6.4 |
| 9 | 15.2 | 150 | 7.2 |
| 10 | 16.2 | 135 | 5.1 |

TABLE 12-continued

| | MEASUREMENT RESULTS | | |
|---|---|---|---|
| TYPE | SATURATION MAGNETIZATION (emu/g) | CURIE TEMPERATURE (C.°) | COERCIVE FORCE (kOe) |
| 11 | 15.3 | 145 | 6.6 |
| 12 | 16.1 | 135 | 5.3 |
| 13 | 19.5 | 140 | 7.9 |

TABLE 13

| | MEASUREMENT RESULTS | | |
| --- | --- | --- | --- |
| TYPE | SATURATION MAGNETIZATION (emu/g) | CURIE TEMPERATURE (C.°) | COERCIVE FORCE (kOe) |
| COMPARATIVE EXAMPLES | | | |
| 1 | 10.1 | 155 | 6.2 |
| 2 | 9.2 | 135 | 5.3 |
| 3 | 9.9 | 150 | 6.1 |
| 4 | 10.2 | 140 | 5.4 |
| 5 | 16.6 | 180 | 8.5 |
| 6 | 10.1 | 130 | 5.2 |
| 7 | 12.3 | 155 | 6.5 |
| 8 | 13.1 | 140 | 3.7 |
| 9 | 11.0 | 150 | 6.9 |
| 10 | 8.0 | 140 | 3.9 |
| 11 | 9.5 | 155 | 7.3 |
| 12 | 7.9 | 135 | 3.5 |

From the results shown in TABLE-12 and TABLE-13, it is seen that each of the inventive magnetic recording powders 1 to 13 has an exceedingly high saturation magnetization ($\sigma s$) of 15 emu/g or higher, and excellent magnetic characteristics: a coercive force of 5 kOe or greater and a Curie temperature of 155° C. or lower. On the contrary, as seen in the comparative magnetic recording powders 1 to 12, at least one of the characteristics (i.e., the saturation magnetization ($\sigma s$), coercive force (iHc) and Curie temperature (Tc)) becomes poor when the content of one of the components (marked with an asterisk (*) in TABLE-11) falls outside the range according to the invention.

Further, each of the inventive magnetic recording powders 1 to 13 had a hexagonal ferrite type crystal structure.

As seen from the above, the magnetic recording powder according to this invention has a saturation magnetization ($\sigma s$) of 15 emu/g or higher, which is considerably higher than the saturation magnetization ($\sigma s$) of 8 to 10 emu/g of the conventional magnetic recording powders. The Curie temperature (Tc) and coercive force (iHc) of the magnetic recording powder of this invention are as good as those of the conventional magnetic recording powders. Thus, the use of this magnetic recording powder for a magnetic card, magnetic tape, magnetic disk or like magnetic storage medium brings about an excellent benefits and advantages, including a thinner magnetic storage medium and high density recording.

While the invention has been particularly shown and described in reference to preferred embodiments thereof, it will be understood by those skilled in the art that changes in form and details may be made therein without departing from the spirit and scope of the invention.

What is claimed is:

1. A magnetic recording powder of a composite oxide having a hexagonal ferrite crystal structure, consisting essentially of:

a) between 14 and 20 atomic % of at least one strontium oxide and barium oxide;

b) between 15 and 40 atomic % of chromium oxide;

c) between 2 and 15 atomic % of a composition selected from the group consisting of zinc oxide, magnesium oxide and copper oxide;

d) between 2 and 15 atomic % of an oxide selected from the group consisting of titanium oxide, zirconium oxide and tin oxide, substantial remainder being iron oxide and unavoidable impurities, wherein the magnetic recording powder of the composite oxide has a saturation magnetization ($\sigma s$) of 15 emu/g or higher and a Curie temperature (Tc) of 155° C. or lower.

2. The magnetic recording powder according to claim 1, wherein the amount of at least one of the strontium oxide and the barium oxide is between 16 and 18 atomic %.

3. The magnetic recording powder according to claim 1, wherein the amount of the chromium oxide is between 20 and 35 atomic %.

4. The magnetic recording powder according to claim 1, wherein the amount of the an oxide selected from the group consisting of zinc oxide, magnesium oxide and copper oxide is between 6 and 11 atomic %.

5. The magnetic recording powder according to claim 1, wherein the amount of the composition selected from the group consisting of titanium oxide, zirconium oxide and tin oxide is between 6 and 11 atomic %.

6. A magnetic recording powder of a composite oxide having a hexagonal ferrite crystal structure, comprising:

a) between 14 and 20 atomic % of at least one of strontium oxide and barium oxide;

b) between 15 and 30 atomic % of chromium oxide;

c) between 2 and 15 atomic % of zinc oxide;

d) between 2 and 15 atomic % of titanium oxide, substantial remainder being iron oxide and unavoidable impurities.

7. The magnetic recording powder according to claim 6, wherein the amount of at least one of the strontium oxide and the barium oxide is between 16 and 18 atomic %.

8. The magnetic recording powder according to claim 6, wherein the amount of the chromium oxide is between 20 and 28 atomic %.

9. The magnetic recording powder according to claim 6, wherein the amount of the zinc oxide is between 6 and 11 atomic %.

10. The magnetic recording powder according to claim 6, wherein the amount of the titanium oxide is between 6 and 11 atomic %.

11. The magnetic recording powder of a composite oxide having a hexagonal ferrite crystal structure, comprising:

a) between 14 and 20 atomic % of at least one of strontium oxide and barium oxide;

b) between 20 and 40 atomic % of chromium oxide;

c) between 2 and 15 atomic % of magnesium oxide;

d) between 2 and 15 atomic % of at least one of titanium oxide and zirconium oxide, substantial remainder being iron oxide and unavoidable impurities.

12. The magnetic recording powder according to claim 11, wherein the amount of at least one of the strontium oxide and the barium oxide is between 16 and 18 atomic %.

13. The magnetic recording powder according to claim 11, wherein the amount of the chromium oxide is between 25 and 35 atomic %.

14. The magnetic recording powder according to claim 11, wherein the amount of the magnesium oxide is between 6 and 11 atomic %.

15. The magnetic recording powder according to claim 11, wherein the amount of at least one of the titanium oxide and the zirconium oxide is between 6 and 11 atomic %.

16. The magnetic recording powder according to claim 1, consisting essentially of:

a) between 14 and 20 atomic % of at least one of strontium oxide and barium oxide;

b) between 20 and 40 atomic % of chromium oxide;

c) between 2 and 15 atomic % of copper oxide; and d) between 2 and 15 atomic % of an oxide selected from the group consisting of titanium oxide, zirconium oxide and tin oxide, substantial remainder being iron oxide and unavoidable impurities.

17. The magnetic recording powder according to claim 16, wherein the amount of at least one of the strontium oxide and the barium oxide is between 16 and 18 atomic %.

18. The magnetic recording powder according to claim 16, wherein the amount of the chromium oxide is between 25 and 35 atomic %.

19. The magnetic recording powder according to claim 16, wherein the amount of the copper oxide is between 6 and 11 atomic %.

20. The magnetic recording powder according to claim 16, wherein the amount of an oxide selected from the group consisting of titanium oxide, zirconium oxide and tin oxide is between 6 and 11 atomic %.

21. A magnetic recording powder of a composite oxide having a hexagonal ferrite crystal structure, comprising:

a) between 14 and 20 atomic % of at least one strontium oxide and barium oxide;

b) between 15 to 30 atomic % of chromium oxide;

c) between 2 and 15 atomic % of an oxide selected from the group consisting of zinc oxide, magnesium oxide and copper oxide;

d) between 2 and 15 atomic % of zirconium oxide, substantial remainder being iron oxide and unavoidable impurities, wherein the magnetic recording powder of the composite oxide has a saturation magnetization ($\sigma$s) of 15 emu/g or higher and a Curie temperature (Tc) of 155° C. or lower.

22. The magnetic recording powder according to claim 21, wherein the amount of at least one of the strontium oxide and the barium oxide is between 16 and 18 atomic %.

23. The magnetic recording powder according to claim 21, wherein the amount of the chromium oxide is between 20 and 35 atomic %.

24. The magnetic recording powder according to claim 21, wherein the amount of the oxide selected from the group consisting of zinc oxide, magnesium oxide and copper oxide is between 6 and 11 atomic %.

25. The magnetic recording powder according to claim 21, wherein the amount of zirconium oxide is between 6 and 11 atomic %.

* * * * *